Oct. 13, 1942.       R. M. NARDONE       2,298,717
ENGINE STARTING MECHANISM
Original Filed Sept. 10, 1938    2 Sheets-Sheet 2
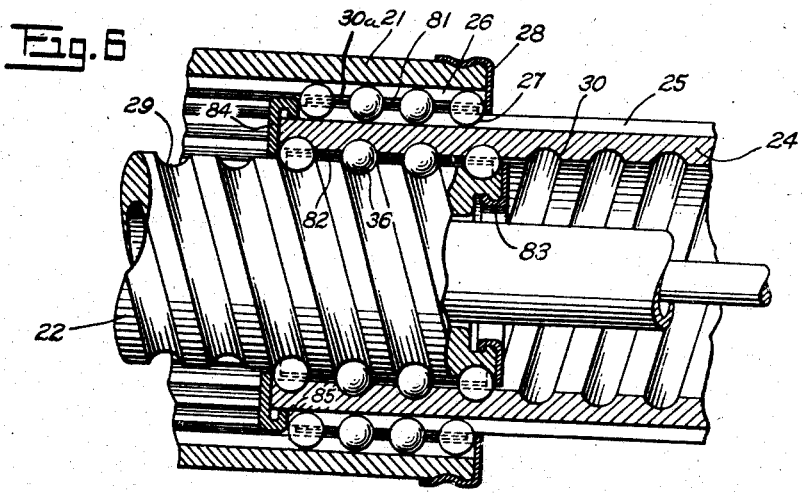
INVENTOR.
Romeo M. Nardone
BY Martin J. Finnegan
ATTORNEY Patented Oct. 13, 1942

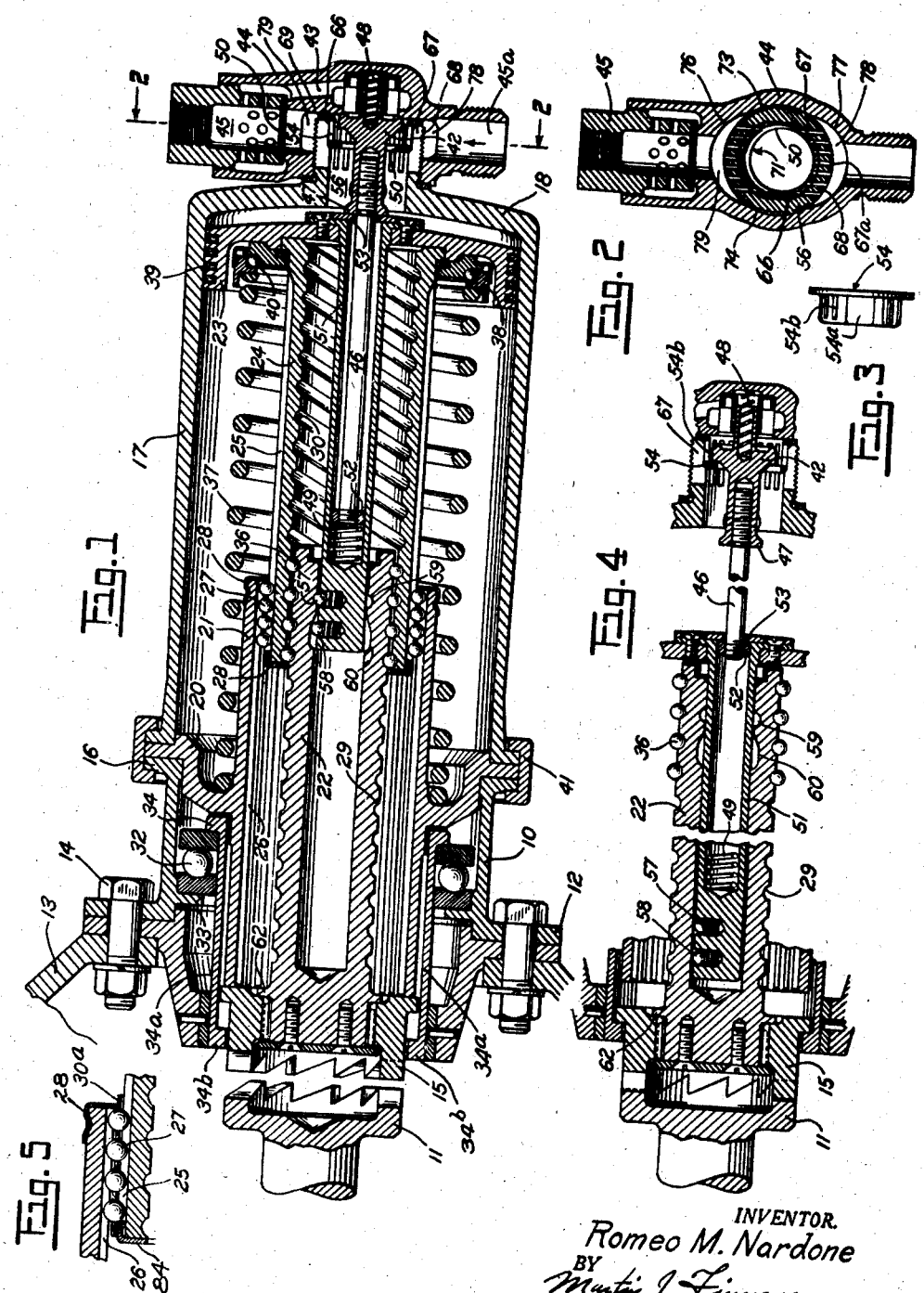

2,298,717

UNITED STATES PATENT OFFICE 2,298,717

ENGINE STARTING MECHANISM

Romeo M. Nardone, East Orange, N. J., assignor to Bendix Aviation Corporation, South Bend, Ind., a corporation of Delaware Original application September 10, 1938, Serial No. 229,376, now Patent No. 2,197,155, dated April 16, 1940. Divided and this application November 9, 1939, Serial No. 303,690

1 Claim. (Cl. 121—37)

This invention relates to engine starters adapted for utilizing fluid pressure, as from air pre-compressed into a reservoir or from an explosive cartridge, the fluid pressure being operable upon a confined piston in the illustrated embodiment of the invention.

One of the objects of this invention is to obtain a relatively large number of starting turns of an engine crankshaft, from a relatively short piston travel.

Another object is to provide means for obtaining a corresponding number of turns of an engine engaging clutch independently of any rotation of the piston.

Another object of the invention is to provide improvements in the type of engine starter disclosed in my Patent No. 2,144,195, granted January 17, 1939, the nature and scope of which improvements are indicated in the accompanying drawings and the following particular description of one form of mechanism embodying the invention. It is to be understood, however, that the drawings are for the purpose of illustration only, and are not designed as a definition of the limits of the invention, reference being had to the appended claim for this purpose.

In the drawings,

Fig. 1 is a longitudinal sectional view of a device embodying the invention;

Fig. 2 is a transverse sectional view along the line 2—2 of Fig. 1;

Fig. 3 is a side elevational view of the thimble-shaped stop;

Fig. 4 is a longitudinal sectional view of certain of the parts of Fig. 1, but in different relative positions; and Fig. 5 is a detail view of the cage balls and stops assembly on an enlarged scale;

Fig. 6 is a longitudinal sectional view of a portion of the motion translating means of Fig. 1, incorporating therein a modified arrangement for retaining and controlling the action of the motion facilitating ball elements carried by said motion translating means.

With reference to the drawings, and more particularly to Fig. 1, the piston actuated unit is contained within a sectional housing including cylindrical parts 17 and 18, the latter having a flange 12 by which it is secured to the engine crankcase 13 as by bolts 14, the flange being conveniently of a size standardized for aircraft engine starters. The engine crankshaft, or other drive shaft (not shown) is provided with a clutch-element 11 engageable by the piston actuated clutch-element 15 as will be later more fully described.

Cylinder 17 has a head end 19 and a crank end 20, the latter being shown as an integral part of a splined tube 21. Slidably fitted within the cylinder 17 is a piston 23 movable with a hollow internally and helically grooved screw 24 which is externally splined as at 25, to cooperate with the internally splined tube 21. Between the cooperating grooves 25 and 26 are placed a series of friction reducing members shown as balls 27 assembled in a cylindrical cage 30a (Fig. 5), the end rows of balls having their surfaces engageable with plates 28 and 84 located at each end of the splined grooves to facilitate free rolling movement of the balls which they engage at points spaced above or below the mid-plane thereof, and also to hold the cage 30a against more than a predetermined endwise movement. A second screw 22 is drivably connected with the screw 24 by helical grooves or threads 29 and 30 which permit the axial travel of the piston 23 but cause rotation of the screw 22 because of friction reducing balls 36 inserted in the helical grooves 29 and 30. An anti-friction thrust bearing 32 is preferably interposed between a flanged skirt 34 on rear end of spacer 34a and an inwardly extending circular rim 33 of the cylindrical part 10. The inwardly extending rim 34b on the forward end of spacer 34a takes the thrust as jaw 15 rides into mesh with engine member 11. A spring 37 has one end resting against the closure plate 20 of the cylinder 17, and its opposite end abuts the thrust ring 38, which is, in effect, the outer race of a ball bearing assembly 40 axially movable with but rotatably free of the piston 23, the intervening bearing balls 40 facilitating free rotation of outer race 38 of the bearing, the outer race being possibly constrained to rotation by the natural twisting tendency of a spring such as the spring 37, as the latter is compressed in the forward travel of the piston. Piston rings 39 insure against the loss of pressure as the piston moves forward, and also yieldably oppose rotation of the piston, even though twisting of spring 37 should occasionally cause outer race 38 to rotate to some extent.

By use of any suitable removable connection 41 between the cylinder 17 and the body flange 16, the former may be quickly detached for removing any fouling that may occur where combustible cartridges are used as the source of fluid pressure to move the piston 23.

The illustrated embodiment also includes improved means for automatically controlling the exhaust of the fluid pressure from the cylinder upon completion of each operation. This exhaust control may be effected by providing an exhaust valve 42 adapted to cooperate with an exhaust port 43 conveniently formed in the housing 44, and communicating with an exhaust connection 45 leading to any desired point. In the case of an airplane, for example, this exhaust connection will lead to a point exteriorly of the fuselage. The valve 42 is carried by a stem 46 which is of such a length that with the piston in its position, as indicated in Figure 1, a spring 49 will bear against an enlarged head 52 on the stem 46 to hold valve 42 closed. At the commencement of an operative cycle of the motor, such as is occasioned by the delivery of fluid pressure to the chamber formed by the neck-portion 56 of the housing 18, this fluid pressure will act upon the head portion of the valve 42 in such manner as to assist the spring 49 in maintaining the said exhaust valve 42 closed; but as the piston nearly reaches the end of its movement, a collar 53 extending inwardly of piston 23 and surrounding the stem 46 will be brought into engagement with the head 52, and will be effective to unseat the exhaust valve 42. The exhaust valve having been unseated in the manner described, the spring 48 will be effective for holding it in open position, its maximum opening movement being limited by a longtudinally slotted cylindrical stop 54 having a flange 66 abutting the end surfaces of the fingers 67 (shown in transverse section of Fig. 2) formed by longitudinally slotting the neck portion 56 of the housing 18. This neck-portion 56 is externally threaded, as shown at 68, to receive the housing 44, the latter being screwed up on the threads 68 until surface 69 of the housing 44 abuts the flange 66 of the stop 54 and with the inlet passage 45a aligned with the longitudinal slots between fingers 67. Stop 54 is adapted to be first slipped over the valve head 42; and due to the eccentricity (indicated at 50 in Fig. 2) of the apertured portion of the base 71 of the said stop, the said base has sufficient surface remaining to constitute a stop or abutment for valve head 42 in the open position of the latter, while at the same time being apertured sufficiently to permit insertion and withdrawal over said valve head.

The piston having completed its operative stroke, and the exhaust valve having been opened, the piston will be urged on its return stroke by the coil spring 37. During this return movement, the exhaust valve being held open, the cylinder will be effectively scavenged. Due to the action of the spring 48 the valve will remain open until such time as the piston collar 53 is brought to bear against the valve stem 47 for again seating the valve. This insures closing movement of the valve at the time the piston has substantially completed its return movement, the closing being iinitiated and assisted by the action of the spring means 49 above described. There is thus provided automatically controlled exhaust means, which exhaust means is of such construction as to remain open during the major portion of the return stroke of the piston so as to insure substantially complete scavenging.

By reason of the action of spring-pressed balls 57 and 58 upon grooves 59 and 60, respectively, in sleeve 22, the initial axial movement of the piston 23 will be transmitted to said sleeve 22, and the axial thrust thus imparted to jaw 15 (through the flange 62 on sleeve 22) will establish engagement with the engine member 11. Upon such engagement the resulting resistance to further axial travel will cause, first, a commencement of rotation on the part of sleeve 22, and secondly, a slipping of the balls 57 and 58 from the grooves 59 to 60, so that they may be free to ride along the inner bore of the sleeve 22 as the piston continues forward; the furthest forward relative position of the balls 57 and 58 being as indicated in Fig. 4.

In order to assure alignment between the longitudinal slots 54b the thimble shaped stop 54, and those slots 67a formed by the fingers 67 of the neck portion 56, flat surfaces 54a are provided on the thimble shaped stop (as indicated in both Figures 2 and 3) to register with corresponding flat surfaces 56a on neck portion 56. Thus there is established a direct path for the pressure fluid entering the housing, said path being in the form of a plurality of parallel passages straight through the lower halves of the slotted cylindrical walls of neck portion 56 and thimble shaped stop 54, the said parallel passages being sufficiently numerous and wide to allow entry of all the non-solid part of the charge, while narrow enough to block entry of any solid (unburned) pellets or particles of explosive material from which the pressure fluid may be generated.

If the entering fluid attains an excessive pressure, sufficient to carry it through the upper slotted sections of thimble shaped stop 54 and neck portion 56, with such abnormal force as to rupture the protective disc 59, the breaking of said disc will permit the escape to the atmosphere, by way of outlet 45, of such excess pressure, thereby protecting the other parts of the device against derangement; but normally the advance of piston 23 (in response to the entry of the fluid into the chamber formed by the neck-portion 56) will be rapid enough to prevent accumulation of excess pressure in the crescent shaped region 79 immediately above the neck-portion 56. This region 79 is formed by making the inner surface of housing 44 elliptical in cross-section, at the parts (76 and 77) above and below the threaded regions (73 and 74) of contact with the threaded surfaces 68 of the neck-portion 56. This has the added advantage of providing a greater width of inlet space at region 78 (Fig. 2) making it possible to utilize all of the parallel passages formed by fingers 67.

In the arrangement shown in Fig. 6 retainer rings 28, 84 and 83 are secured to the ends of elements 21, 24 and 22, respectively, and engage the end rows of the balls 27 and 36 in tangential fashion rather than the edges of the cages, so that they tend to insure free rolling of the said balls, where otherwise there might be a binding or wedging tendency—as, for example, if the retainer surfaces engaged the balls at points in the surface of a cone passing through the centers of said balls, with its apex on the longitudinal axis of the sleeves 21, 24 and 22.

This application is a division of my co-pending application Serial No. 229,376, filed September 10, 1938, since issued as Patent No. 2,197,155.

What is claimed is:

In an engine starter, the combination with an engine engaging member and a piston adapted for axial advance, of motion translating means coupling said piston to said engine engaging member, said motion translating means including two cylindrical drive transmitting parts one of which is internally threaded and the other of which is externally threaded, and a cylindrical roller retaining cage interposed between said drive transmitting parts, said cage having a wall of uniform thickness from one end thereof to the other, and said wall having ball receiving perforations at spaced intervals along a helical path corresponding in pitch to the pitch of the threads of said drive transmitting parts.

ROMEO M. NARDONE.